United States Patent [19]

Koffel et al.

[11] 4,411,597
[45] Oct. 25, 1983

[54] TIP CAP FOR A ROTOR BLADE

[75] Inventors: William K. Koffel, Cincinnati; Eugene N. Tuley, Hamilton; Charles H. Gay, Jr., Loveland; Raymond E. Troeger, Fairfield, all of Ohio; Albert P. Sterman, deceased, late of Cincinnati, Ohio, by Florence G. Sterman, executrix

[73] Assignee: The United States of America as represented by the Administrator of the National Aeronautics and Space Administration, Washington, D.C.

[21] Appl. No.: 245,571

[22] Filed: Mar. 20, 1981

[51] Int. Cl.³ .................................................. F01D 5/18
[52] U.S. Cl. .................................. 416/92; 416/97 R; 416/224; 416/233
[58] Field of Search .............. 416/90 R, 92, 95, 96 R, 416/96 A, 97 R, 97 A, 224, 232, 233; 415/174

[56] References Cited

U.S. PATENT DOCUMENTS

| 3,389,889 | 6/1968 | Penny | 416/92 |
| 3,527,544 | 9/1970 | Allen | 416/97 R X |
| 3,528,751 | 9/1970 | Quinones et al. | 416/97 R X |
| 3,854,842 | 12/1974 | Caudill | 416/92 X |
| 3,885,886 | 5/1975 | Richter | 416/92 X |
| 3,934,322 | 1/1976 | Hauser et al. | 29/156.8 H |
| 4,017,209 | 4/1977 | Bodman | 416/97 R |
| 4,169,020 | 9/1979 | Stalker et al. | 415/174 X |
| 4,185,369 | 1/1980 | Darrow et al. | 416/92 X |
| 4,193,738 | 3/1980 | Landis, Jr. et al. | 415/115 |

FOREIGN PATENT DOCUMENTS

| 2843326 | 4/1979 | Fed. Rep. of Germany | 416/97 R |
| 586838 | 4/1947 | United Kingdom | 416/97 R |
| 1276200 | 6/1972 | United Kingdom | 416/92 |

Primary Examiner—Philip R. Coe
Attorney, Agent, or Firm—Norman T. Musial; John R. Manning

[57] ABSTRACT

A replaceable tip cap for attachment to the end of a rotor blade. The tip cap includes a plurality of walls defining a compartment which, if desired, can be divided into a plurality of subcompartments. The tip cap can include inlet and outlet holes in walls thereof to permit fluid communication of a cooling fluid therethrough. Abrasive material can be attached with the radially outer wall of the tip cap.

17 Claims, 6 Drawing Figures

U.S. Patent  Oct. 25, 1983  4,411,597
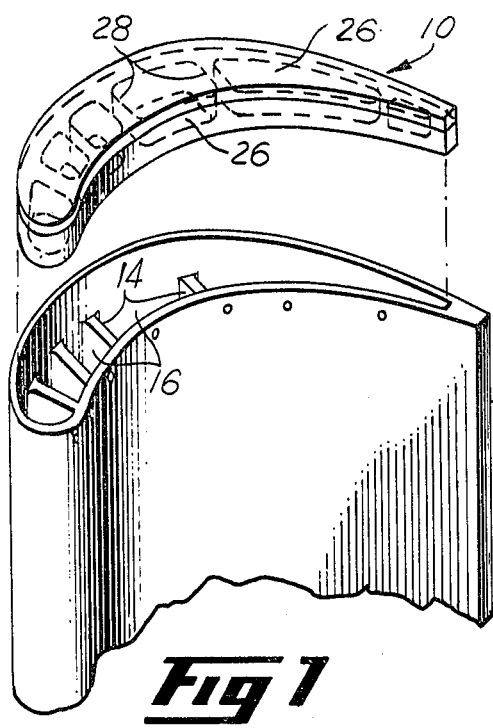
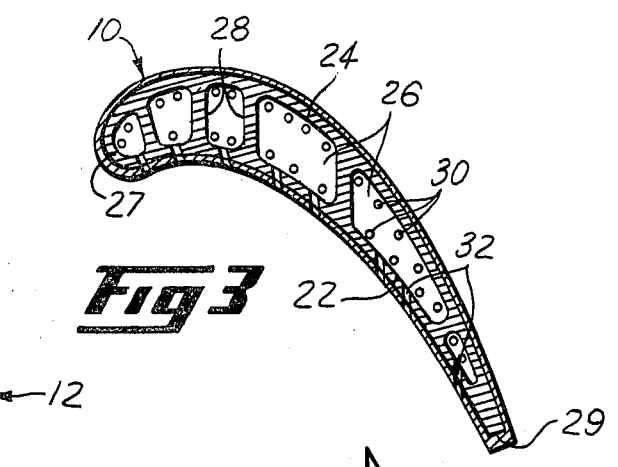
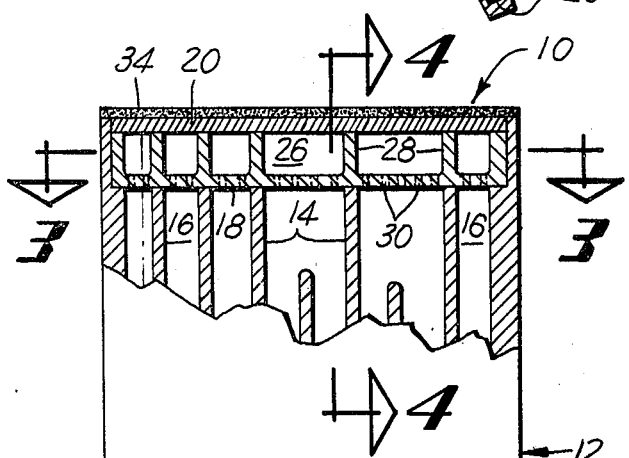
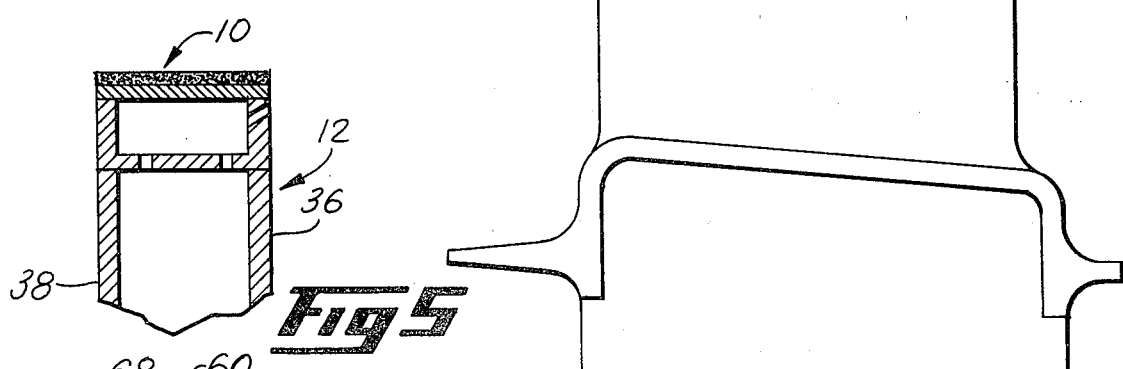
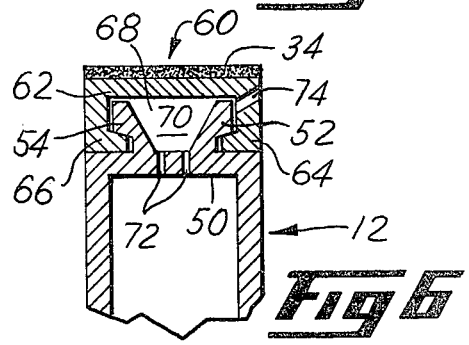
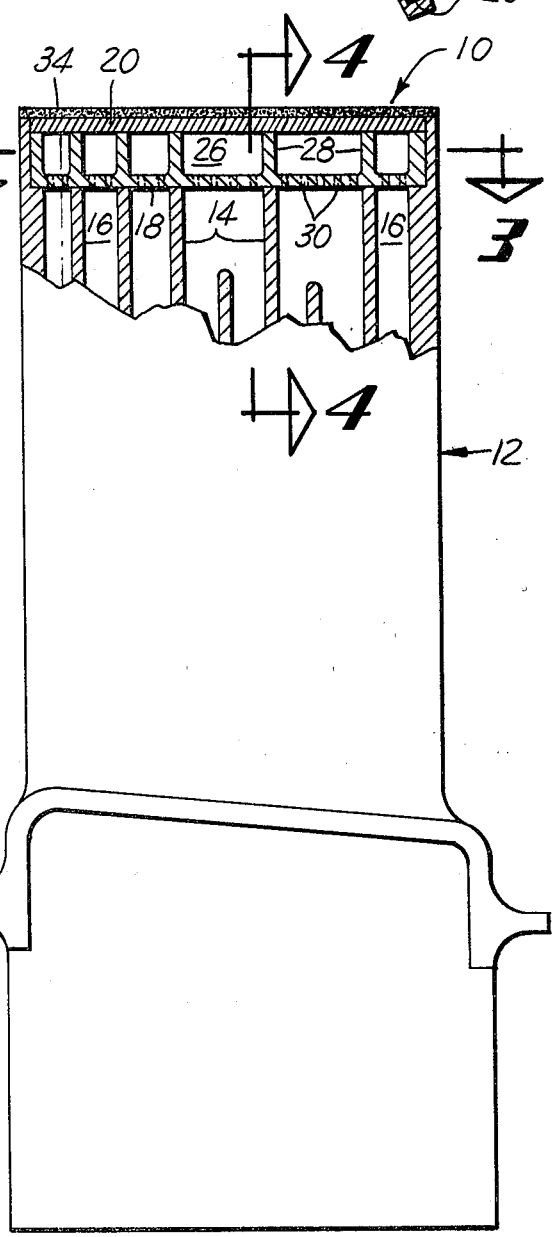

TIP CAP FOR A ROTOR BLADE

The invention herein described was conceived in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

This invention relates to tip caps for rotor blades and particularly to a new and improved replaceable tip cap having a unique structure for better cooling and longer life.

2. Description of the Prior Art

The efficiency of gas turbine engines can be increased by reducing the clearance between rotating and stationary parts. This is particularly important with respect to rotor blades, such as in a turbine, where tip losses, that is, air flowing around the end of, rather than streamwise across, the rotor blade, can occur because of too great a gap between the radially outer end of the rotor blade and a surrounding stationary shroud.

To reduce the size of the gap and thus reduce tip losses, the end of a rotor blade can be modified or a separate tip cap can be attached thereto. Such a blade end modification or a tip cap often comprises a recessed tip cavity between thin, radially extending blade edges, ribs or flanges, hereinafter cumulatively referred to as "blade edges". The rotor blade and its tip become hot during engine operation and must be cooled in some manner to provide strength and durability. Often, cooling of the rotor blade is accomplished by directing a fluid, such as pressurized air, through the hollow interior of the rotor blade. However, since the radially outer portions of the extending blade edges are located at a distance from the hollow portion of the internally cooled rotor blade, hot spots, that is, uncooled or inadequately cooled areas, can occur on the blade edges. In some rotor blades, such hot spots can be partially eliminated by including holes near the radially outer end of the rotor blade or in the base portion of the tip cap to direct air from the interior of the rotor blade to flow along or to impinge against the blade edges. However, even in such an arrangement, the cooling can be inadequate and hot spots can persist on the blade edges causing tip cracks and progressive oxidation to the point that the rotor blade must be prematurely removed from service for repair.

Another problem encountered with previous blade tips or tip caps is lack of wear resistance should a tip rub occur. The small cross-sectional area of the thin blade edges of the above-described blade tips or tip caps permits the blade edges to become highly heated and to wear relatively quickly. The resulting increase in the clearance between the rotor blade tip and the stationary shroud reduces engine efficiency. The engine efficiency loss is reflected in a higher turbine inlet temperature, and thus higher fuel consumption, required to achieve the same power output.

In view of the above-mentioned problems, therefore, an object of the present invention is to provide a replaceable tip cap for a rotor blade which includes an improved cooling arrangement therein to reduce tip cap overheating and thus increase tip cap life.

Another object of the present invention is to provide a replaceable tip cap with increased wear resistance which thereby reduces the rate of engine efficiency loss.

SUMMARY OF THE INVENTION

The present invention comprises a replaceable tip cap for a rotor blade. The tip cap comprises a plurality of walls for defining a compartment. The tip cap is attachable to the radially outer end of the rotor blade.

In a particular embodiment of the invention, a compartment within the tip cap is divided into a plurality of subcompartments. The subcompartments receive a flow of cooling fluid through inlet holes in the radially inner wall of the tip cap and the fluid exits through outlet holes in a sidewall of the tip cap.

The tip cap can include abrasive material attached with the radially outer wall thereof.

BRIEF DESCRIPTION OF THE DRAWING

This invention will be better understood from the following description taken in conjunction with the accompanying drawing, wherein:

FIG. 1 is a fragmentary perspective view of the tip cap of the present invention and the rotor blade to which it is attached.

FIG. 2 is a side cross-sectional view of the tip cap attached to the rotor blade and showing the compartments and cooling passages, respectively, therein.

FIG. 3 is a cross-sectional view of the tip cap taken along lines 3—3 of FIG. 2.

FIG. 4 is a cross-sectional view of the tip cap taken along lines 4—4 of FIG. 2.

FIG. 5 is a cross-sectional view of an alternative arrangement of the tip cap with the rotor blade.

FIG. 6 is a cross-sectional view of another configuration of the tip cap with the rotor blade.

DESCRIPTION OF THE PREFERRED EMBODIMENT

Turning now to a consideration of the drawing, and in particular to FIG. 1, there is shown a replaceable tip cap 10 for a rotor blade 12. The rotor blade 12 extends in a generally radial direction from its attachment point on a rotor disk. The tip cap 10 is attachable to the radially outer end of a rotor blade 12.

The rotor blade 12 preferably has a generally hollow interior such that a fluid, such as air, can flow through the blade to cool it. As can be seen in FIGS. 1 and 2, the interior of the rotor blade 12 can include a plurality of radially aligned ribs 14 which define a plurality of cooling passages 16 in the rotor blade. At least some of the ribs 14 extend to near the radially outer end of the rotor blade 12. Of course, the number of ribs 14 and their disposition within the rotor blade 12 can be varied as desired and those depicted in FIGS. 1 and 2 are only shown as an example.

Referring to FIGS. 2 and 3, the tip cap 10 comprises a plurality of walls which define a compartment therebetween. The compartment is preferably enclosed, that is, surrounded on all sides by walls. The tip cap 10 can be fabricated in any suitable manner. For example, the parts of the tip cap can be cast or machined separately and then assembled to form the tip cap. The tip cap 10 preferably includes a radially inner wall 18, a radially outer wall 20, and two curved sidewalls 22 and 24 which are joined at the leading and trailing edges 27 and 29, respectively, thereof. It is intended that the word "joined" can include any means of connecting two separate sidewalls 22 and 24, and that it also include, alternatively, that the sidewalls 22 and 24 can be integral with each other at the leading and trailing edges 27 and 29. When the tip cap 10 is generally airfoil shaped, as it is in FIG. 3, the sidewall 22 comprises a pressure sidewall and a sidewall 24 comprises a suction sidewall.

As is best seen in FIG. 1, the compartment defined between the walls of the tip cap 10 is preferably divided into a plurality of subcompartments 26 by a plurality of bulkheads 28. The bulkheads 28 extend radially and between the sidewalls 22 and 24. For reasons to be explained shortly, the bulkheads preferably are connected with the radially inner and outer walls 18 and 20 as well as with the sidewalls 22 and 24 such that fluid communication between the subcompartments 26 is substantially prevented. It is also preferable that the bulkheads 28 be so disposed within the tip cap that they are substantially radially aligned with the ribs 14 which extend to near the radially outer end of the rotor blade 12.

The radially inner wall 18 of the tip cap 10 includes a plurality of inlet holes 30 therethrough for providing fluid communication between the compartment in the tip cap and the interior of the rotor blade 12. When the tip cap 10 is divided into subcompartments 26 and the rotor blade 12 includes cooling passages 16, the inlet holes 30 are disposed in the radially inner wall 18 such that at least one of the inlet holes 30 provides fluid communication to each of the subcompartments 26 from the cooling passage 16 disposed radially inward of that subcompartment.

As can be seen in FIG. 3, at least one of the sidewalls 22 or 24 of the tip cap 10 includes a plurality of outlet holes 32 therethrough for providing fluid communication between the compartment in the tip cap and the exterior of the tip cap. When the tip cap 10 includes subcompartments 26, the outlet holes 32 are disposed such that at least one outlet hole 32 provides fluid communication between each of the subcompartments 26 and the exterior of the tip cap.

The above-described arrangement of the inlet and outlet holes 30 and 32 facilitates cooling of the tip cap 10. A portion of the fluid, such as air, which flows through the cooling passages 16 in the interior of the rotor blade 12 to cool the rotor blade, also flows through the inlet holes 30 into the subcompartments 26 of the tip cap 10. That fluid impinges upon the interior surface of the radially outer wall 20 and circulates within the subcompartment, flowing along the sidewalls 22 and 24 and back over the radially inner wall 18. The fluid then exits the subcompartment through the outlet holes 32 to the exterior of the tip cap. The tip cap 10 exchanges heat with the fluid flowing through and exiting from it, thus cooling the tip cap. The cooling arrangement of the tip cap 10 moves the internal flow of cooling fluid closer to the radially outer portion of the tip cap in comparison with typical prior tip caps. Such prior tip caps often comprise radially extending blade edges, ribs or flanges which are separated from the interior flow of cooling fluid. The cooling arrangement of the tip cap 10 results in stronger and more even cooling and lower tip cap temperatures, and therefore an increase in tip cap life. Additionally, the above-described arrangement of inlet holes in the radially inner wall 18 also provides a safety factor. Should a very severe tip rub occur with a shroud surrounding the rotor causing the radially outer wall 20 to be torn away, the radially inner wall 18 would remain intact and thus prevent excessive loss of blade cooling air that might result in burnout or melting of the rotor blade.

As indicated earlier, the bulkheads 28 are preferably disposed so as to prevent fluid communication between subcompartments 26 and to be in generally radial alignment with the ribs 14. Such an arrangement also promotes better cooling of the tip cap. The fluid flowing through the various cooling passages 16 in the rotor blade 12 may be of differing pressures. If those fluids of differing pressures were to mix within one compartment of the tip cap 10, there might occur a backflow of fluid through the inlet holes 30 from higher to lower pressure cooling passages 16 adversely affecting tip cap cooling. Additionally, the use of a single compartment in the tip cap could result in degradation in impingement cooling of the radially outer wall 20. The crossflow of spent impingement fluid, in addition to the above-mentioned fluid backflow, could deflect the jets of fluid flowing through the inlet holes 30, causing the fluid to impinge upon the radially outer wall 20 at an angle rather than substantially normal to it, impingement at the normal being the most effective for cooling. The arrangement shown in FIG. 2 permits control of the cooling fluid in the subcompartments and thus substantially avoids the above-described problems and thereby provides more effective control of tip cap temperatures.

In the configuration shown in FIGS. 3 and 4, the outlet holes 32 are disposed in the sidewall 22 which comprises the pressure sidewall. This arrangement promotes efficient cooling of the tip cap. Discharging the cooling fluid through the outlet holes 32 in the pressure sidewall results in lower parasitic losses to turbine performance than would discharging the cooling fluid through the sidewall 24, which comprises the suction sidewall. Additionally, discharging the cooling fluid through the pressure sidewall permits the cooling fluid to mix with hot gases which might leak around the radially outer end of the rotor blade 12, such mixing tending to decrease the temperature of the tip cap environment. Of course, the number and location of inlet and outlet holes 30 and 32 can be varied as desired and those shown in the drawing are but one such example.

The radially outer wall 20 of the tip cap 10 presents a solid continuous radially outer surface which is of substantially larger area compared with the end areas of thin radially outer surfaces of the blade edges, ribs or flanges of prior tip caps. Thus, should a rub occur between the tip cap 10 and a shroud surrounding the rotor, the larger area of the radially outer wall 20 of the present tip cap would be worn away less than would the radially outer surfaces of the narrower blade edges, ribs or flanges extending from prior tip caps. This is particularly true in view of the improved cooling of the radially outer wall 20 provided by the present invention.

If desired, abrasive material 34 can be attached with the radially outer surface of the radially outer wall 20. In case of a rub, the abrasive material 34 would be worn away rather than the radially outer wall 20. The abrasive material 34 would also tend to wear away high spots on a surrounding shroud. Any desired abrasive material can be used, such as, for example, aluminum oxide.

The tip cap 10 is attached with the radially outer end of the rotor blade 12 in any suitable manner. For example, in the arrangement shown in FIGS. 1 through 4, the rotor blade 12 includes a recess in the radially outer end thereof and the tip cap 10 is sized for being received in the recess for attachment to the rotor blade. The recess, which can best be seen in FIG. 4, is defined by radially outer portions of the walls 36 and 38 of the rotor blade 12. The inner surfaces of the radially outer portions of the walls 36 and 38 can be cut away so as to define ledges, as at 40 and 42, against which the tip cap 10 can abut. The ledges can be aligned with the radially outer ends of the ribs 14, as can be seen in FIG. 2, such that the tip cap 10 abuts them also. If desired, the radially outer portions of the walls 36 and 38 can be crimped against the sides of the tip cap 10 to help retain it.

As can be seen in FIG. 4, the radially outer portion of the wall 36 includes a plurality of apertures 44 therethrough which are disposed such that they are in fluid communication with the outlet holes 32 in the sidewall 22 of the tip cap 10. This arrangement prevents blockage of the outlet holes 32 and thereby promotes fluid communication between the subcompartments 26 and the exterior of the tip cap 10 and the rotor blade 12.

When the tip cap 10 includes abrasive material 34 attached with the radially outer surface of the radially outer wall 20 thereof, the tip cap is preferably sized such that the radially outer wall 20 is disposed substantially coplanar with the radially outer ends of the walls 36 and 38 of the rotor blade 12. The abrasive material 34 thus becomes the radially outermost portion of the assembled rotor blade and tip cap.

FIG. 5 shows an alternate arrangement of the tip cap 10 with the rotor blade 12. In this arrangement, the tip cap 10 is attached directly to the radially outer ends of the walls 36 and 38 of the rotor blade, rather than being received in a recess. Otherwise, the tip cap 10 itself is the same in this arrangement as it is in the prior arrangement.

The tip cap 10 is replaceable. In both of the arrangements described above, the tip cap 10 can be attached to and removed from the end of the rotor blade 12 in any suitable manner. For example, the tip cap can be brazed, welded or diffusion bonded to the end of the rotor blade. When it is desired to remove that tip cap and replace it with another, an example of a manner of removing it is through electrodischarge machining or, in the case of the arrangement shown in FIG. 5, the old tip cap 10 can be simply cut off.

FIG. 6 shows another configuration of the present invention. The rotor blade 12 includes an end wall 50 at the radially outer end thereof. Tracks 52 and 54 extend generally radially outward from the end wall 50 and at an angle such that they form the male portion of a dovetail joint.

The tip cap 60 comprises a radially outer wall 62 and curved sidewalls 64 and 66. The radially inner portions of the sidewalls 64 and 66 are shaped such that they form the female portion of a dovetail joint such that they can be engaged by the tracks 52 and 54 and thereby retain the tip cap 60 on the rotor blade 12.

The end wall 50 of the rotor blade 12 defines with the sidewalls 64 and 66 and the radially outer wall 62 a compartment therebetween which improves the cooling of the tip cap 60 in the same manner as do the previously described configurations. A plurality of radially extending bulkheads 68 are preferably attached or are integral with and extend between the tracks 52 and 54 so as to define a plurality of subcompartments 70 within the compartment defined between the tip cap 60 and the end of the rotor blade 12. The end wall 50 includes a plurality of inlet holes 72 therethrough which provide fluid communication between the hollow interior of the rotor blade 12 and the subcompartments 70. At least one of the tracks 52 or 54 and at least one of the sidewalls 64 or 66 include holes therethrough which align to define outlet holes 74 to provide fluid communication between the subcompartments 70 and the exterior of the tip cap 60.

The tip cap 60 can include abrasive material 34 attached with the radially outer surface of the radially outer wall 62.

One manner of attaching the tip cap 60 to the rotor blade 12 is as follows. The tip cap 60 is fabricated either in two pieces or in one piece and then cut into two pieces. The parting line between the two pieces is located transversely through the tip cap near the mid portion of the tip cap such that one piece includes the leading edge and the other piece includes the trailing edge of the tip cap. The piece of the tip cap 60 which includes the leading edge is then slid along the tracks 52 and 54 from the leading edge of the rotor blade 12 such that the sidewalls 64 and 66 engage the tracks 52 and 54. The piece of the tip cap 60 which includes the trailing edge is likewise slid along the tracks 52 and 54 from the trailing edge of the rotor blade 12. The abutting edges of the pieces of the tip cap 60 are then joined in an appropriate manner, such as by brazing, welding or diffusion bonding.

It is to be understood that this invention is not limited to the particular embodiment disclosed, and it is intended to cover all modifications coming within the true spirit and scope of this invention as claimed.

What is claimed is:

1. A replaceable tip cap for attachment to the radially outer end of a hollow rotor blade, said tip cap comprising:
   (a) two curved sidewalls joined at leading and trailing edges thereof and defining an airfoil shape,
   (b) a radially outer wall and a pressure maintaining radially inner wall, both joined to the curved sidewalls to form a compartment, the radially inner wall having a plurality of holes extending therethrough, and
   (c) a plurality of bulkheads contained within the compartment for defining several subcompartments, each subcompartment for containing air at a different pressure, and each subcompartment communicating with at least one of the holes in the radially inner wall.

2. A replaceable tip cap for attachment to the radially outer end of a rotor blade having a hollow interior comprising:
   (a) a radially inner wall,
   (b) two curved sidewalls joined at leading and trailing edges thereof, and
   (c) a radially outer wall, said radially inner and outer walls and said sidewalls defining a compartment therebetween, said radially inner wall including a plurality of inlet holes therethrough for providing fluid communication between said interior of said rotor blade and said compartment, and at least one of said sidewalls including a plurality of outlet holes therethrough for providing fluid communication between said compartment and the exterior of said tip cap.

3. The tip cap of claim 2 wherein said tip cap includes a plurality of bulkheads extending radially and between said sidewalls for dividing said compartment into a plurality of subcompartments.

4. The tip cap of claim 3 wherein said rotor blade includes in the interior thereof a plurality of radially aligned ribs extending to near the radially outer end thereof for defining a plurality of cooling passages therein and said bulkheads are so disposed within said tip cap so as to be substantially radially aligned with said ribs.

5. The tip cap of claim 4 wherein said bulkheads are connected with said sidewalls and said radially inner and outer walls so as to substantially prevent fluid communication between said subcompartments.

6. The tip cap of claim 5 wherein said inlet holes are disposed in said radially inner wall of said tip cap such that at least one of said inlet holes provides fluid communication to each of said subcompartments from the cooling passage disposed radially inward of the subcompartment.

7. The tip cap of claim 6 wherein said sidewalls of said tip cap comprise a pressure sidewall and a suction sidewall and said plurality of outlet holes are disposed in said pressure sidewall.

8. The tip cap of claim 2 wherein said radially outer wall includes abrasive material attached with the radially outer surface thereof.

9. The tip cap of claim 2 wherein said rotor blade includes a recess in the radially outer end thereof and said tip cap is sized for being received in said recess for attachment to said rotor blade.

10. The tip cap of claim 9 wherein said recess is defined by radially outer portions of walls of said rotor blade, a radially outer portion of one of said walls including a plurality of apertures therethrough, and said outlet holes in said sidewalls of said tip cap are arranged so as to be in fluid communication with said apertures.

11. The tip cap of claim 9 wherein said tip cap is sized such that said radially outer wall thereof is disposed substantially coplanar with the radially outer ends of said walls of said rotor blade and said radially outer wall includes abrasive material attached with the radially outer surface thereof.

12. A replaceable tip cap for a rotor blade, said rotor blade having a generally hollow interior, said tip cap being sized for being attached to a radially outer end of said rotor blade and comprising:
 (a) a radially inner wall including a plurality of inlet holes therethrough;
 (b) a radially outer wall;
 (c) two curved sidewalls joined at leading and trailing edges thereof, at least one of said sidewalls including outlet holes therethrough, said radially inner, radially outer, and curved sidewalls defining a compartment therebetween;
 (d) a plurality of bulkheads extending radially and between said sidewalls for dividing said compartment into a plurality of subcompartments, said inlet holes in said radially inner wall and said outlet holes in one of said sidewalls being arranged for providing fluid communication between each of said subcompartments and said interior of said rotor blade and said exterior of said tip cap, respectively; and
 (e) abrasive material attached with a radially outer surface of said radially outer wall.

13. The tip cap of claim 12 wherein said rotor blade includes a recess in the radially outer end thereof and said tip cap is sized for being received in said recess for attachment to said rotor blade.

14. The tip cap of claim 13 wherein said inlet holes in said radially inner wall are arranged to provide impingement cooling of said radially outer wall.

15. The tip cap of claim 2 wherein said rotor blade includes an end wall at the radially outer end thereof and said tip cap includes a radially outer wall and two curved sidewalls joined at leading and trailing edges thereof, said end wall, said radially outer wall and said sidewalls defining said compartment therebetween.

16. The tip cap of claim 15 wherein said end wall includes generally radially extending tracks and said sidewalls of said tip cap are shaped for being engaged by said tracks for thereby retaining said tip cap on said rotor blade.

17. The tip cap of claim 16 wherein said tip cap includes abrasive material attached with a radially outer surface of said radially outer wall.

* * * * *